United States Patent
Kusafuka et al.

[11] Patent Number: 6,050,919
[45] Date of Patent: Apr. 18, 2000

[54] LOCK-UP SLIP CONTROL DEVICE FOR AUTOMATIC TRANSMISSION

[75] Inventors: Muneo Kusafuka; Kazuhiro Mikami; Kazuomi Okasaka, all of Anjo, Japan

[73] Assignee: Aisin AW Co., Ltd., Anjo, Japan

[21] Appl. No.: 09/062,738

[22] Filed: Apr. 20, 1998

[30] Foreign Application Priority Data

May 23, 1997 [JP] Japan .................................. 9-150186

[51] Int. Cl.⁷ .................................................. F16H 61/14
[52] U.S. Cl. ............................ 477/176; 477/62; 477/169
[58] Field of Search ........................... 192/3.31; 477/61, 477/62, 63, 64, 169, 176

[56] References Cited

U.S. PATENT DOCUMENTS

| | | | |
|---|---|---|---|
| 4,456,107 | 6/1984 | Ito et al. | 477/62 X |
| 4,582,185 | 4/1986 | Grimes et al. | 477/176 X |
| 4,940,122 | 7/1990 | Fujieda | 477/169 X |
| 5,562,571 | 10/1996 | Maruyama et al. | 477/62 X |
| 5,683,329 | 11/1997 | Kono et al. | 477/176 |

FOREIGN PATENT DOCUMENTS 8-28681  2/1996  Japan .

*Primary Examiner*—Charles A. Marmor
*Assistant Examiner*—Sherry Lynn Estremsky
*Attorney, Agent, or Firm*—Oliff & Berridge, PLC

[57] ABSTRACT

A control device for an automatic transmission having a hydraulic power transmission with a lock-up clutch includes a device for setting a predetermined pressure that is less than a pressure at which a target value convergence control is started. The predetermined pressure is set as the hydraulic pressure applied to the lock-up clutch by a predetermined pressure setting device for a predetermined time. The predetermined time is a time from a satisfaction of conditions for the slip control start until an input rotation speed is stabilized, as set by a time setting device.

20 Claims, 9 Drawing Sheets

BASIC TARGET SLIP ROTATION SPEED = 100 RPM

| TURBINE ROTATION SPEED \ THROTTLE OPENING | 10 | 15 | 20 | 25 | ... |
|---|---|---|---|---|---|
| 1,000 | 1.2 | 1.8 | 2.5 | 2.8 | ... |
| 1,500 | 1.2 | 1.2 | 2.0 | 2.2 | ... |
| 2,000 | 1.2 | 1.2 | 1.6 | 1.9 | ... |
| 2,500 | 1.2 | 1.2 | 1.2 | 1.4 | ... |
| 3,000 | 1.2 | 1.2 | 1.2 | 1.2 | ... |
| ⋮ | ⋮ | ⋮ | ⋮ | ⋮ | |

FIG.7  UNIT : 1 kgf/cm²

LOCK-UP SLIP CONTROL DEVICE FOR AUTOMATIC TRANSMISSION

BACKGROUND OF THE INVENTION

1. Field of Invention

The invention relates to an automatic transmission. More specifically, it relates to a lock-up slip control for a hydraulic power transmission of the automatic transmission.

2. Description of Related Art

An automatic transmission has a lock-up clutch for preventing reduction of a transmission efficiency based on a fluid in a hydraulic power transmission of the automatic transmission. In this transmission, when the lock-up clutch is engaged during an engine rotation speed with the engine output power being low, a torque vibration of the engine is transmitted to the automatic transmission. In order to cutoff the engine vibration and improve fuel consumption, lock-up ON (i.e. the lock-up clutch is engaged) and lock-up OFF (i.e. the lock-up clutch is disengaged) are performed by a hydraulic control based on a lock-up diagram deciding a lock-up ON region and lock-up OFF region and an actual vehicle speed and an actual throttle opening of a driving vehicle. The lock-up ON region and the lock-up OFF region in the lock-up diagram correspond to a vehicle speed and a throttle opening, and the lock-up diagram is stored in a control device for the automatic transmission.

Recently, for the purpose of expanding the operation region of the lock-up clutch to low vehicle speed as much as possible and to improve fuel consumption, a proposal has been made that allows a slip control of the lock-up clutch for absorbing the torque vibration from the engine and supporting a torque transmission. An example of the technology is disclosed in Japanese Patent Laid-Open No. Hei8-28681. In this transmission, during the slip control, a feedforward control, which controls a hydraulic pressure applied to the lock-up clutch corresponding to a target value, is performed for bringing a slip rotation speed gradually to a target value. The slip rotation speed is a difference between an input rotation speed of the hydraulic power transmission, that is an engine output rotation speed, and an output rotation speed of the hydraulic power transmission, that is a transmission input rotation speed. During a lock-up clutch releasing state the slip rotation is brought gradually to a finalized slip rotation speed, which is called a basic target slip rotation speed in this specification. In order to prevent an overshoot of the control when approaching the basic target slip rotation speed as a result of a rapid change of the target slip rotation speed, a control is proposed in which an amount of reduction of the target slip rotation speed is reduced as the target value approaches the basic target slip rotation speed. Such a control is called a target value convergence control in this specification.

There are two cases for conversion from the lock-up OFF region to a slip control region. A first case is that the vehicle running condition based on the vehicle speed and the vehicle throttle opening change from the lock-up OFF region to the slip control region corresponding to an almost constant throttle opening and an increasing vehicle speed. A second case is that the vehicle running condition based on the vehicle speed and the vehicle throttle opening change from the lock-up OFF region to the slip control region corresponding to an almost constant vehicle speed and a rapidly changing throttle opening. In the first case, when the target value convergence control is performed immediately, there is no problem with controllability because the engine output rotation speed is stabilized. But in the second case, when the target value convergence control is performed immediately, the control is not stabilized because the engine output rotation speed is not stabilized. Then, in the above mentioned related art, the target slip rotation speed is set as the actual slip rotation speed and a feedforward value, that is a linear solenoid output value corresponding to the target slip rotation speed, is output for a predetermined time after satisfaction of conditions for the slip control. Then, the target value convergence control is not performed substantially. Therefore, problems of controllability are solved.

However, even if the control taught by the related art is performed, the following problems may occur during a time in which the engine rotation speed is unstable, such as right after moving to the slip control region.

(1) The actual slip rotation speed becomes unstable because of the instability of the engine rotation speed. Therefore, the control of the linear solenoid output value becomes unstable.

(2) When an engine output torque is reduced because of, for example, a drive at high altitudes or when the engine power output is otherwise lowered, an input torque against a throttle opening becomes small compared with a usual input torque against the throttle opening. Then, the linear solenoid output value corresponding to the throttle opening, which is on a table stored in advance, is set without consideration of the amount of the reduction of the engine output torque. Therefore, the linear solenoid output value becomes too large as compared with a proper value actually required at the lower level of power output. As a result, the lock-up clutch is further engaged, the actual slip rotation becomes small, and target slip rotation speed which is set based on the actual slip rotation value becomes small. Then, a further large linear solenoid output value which is not proper is output. Because of repetition of such states, the actual slip rotation speed is decreased largely before performing the target value convergence control, and the lock-up clutch may be engaged. As a result, a noise and a shock are produced thus making a driver feel uncomfortable.

SUMMARY OF THE INVENTION

A first object of the invention is to provide a lock-up slip control device for an automatic transmission which keeps a linear solenoid output value at a predetermined value for a time, during which an input rotation speed of a hydraulic power transmission may be unstable because of a change of an engine rotation speed, so that a slip rotation speed is not changed, and the slip control is performed without becoming unstable as a result of a change of the input rotation speed of the hydraulic power transmission.

A second object of the invention is to perform the slip control smoothly, even when a shift is performed during the time in which the input rotation speed of the hydraulic power transmission may be unstable.

A third object of the invention is to reduce a delay for moving from the releasing state of the lock-up clutch to the slip state of the lock-up clutch. The delay may occur because the start of the slip control is delayed for the time during which the input rotation speed of the hydraulic power transmission may be unstable.

A fourth object of the invention is to prevent an error in the linear solenoid output value necessary for achieving the target slip rotation speed including the basic target slip rotation speed by correcting the linear solenoid output value used for the lock-up slip control based on the linear solenoid output value actually needed for achieving the actual slip rotation speed. The correction of linear solenoid output value prevents effects on the slip control because of the reduction of the engine output torque.

A fifth object of the invention is to perform the control for the lock-up clutch from the releasing state until achieving the basic target slip rotation speed smoothly while the first to the fourth objects are also achieved.

In order to achieve the first object, a lock-up slip control device for an automatic transmission controls a slip rotation of a lock-up clutch to converge on a basic target slip rotation speed by controlling a hydraulic pressure applied to the lock-up clutch. The slip rotation is a difference between an input rotation speed of the hydraulic power transmission and an output rotation speed of the hydraulic power transmission. The lock-up control device comprises a time setting means which sets a first predetermined time measured from when conditions for a lock-up slip control start are satisfied until the input rotation speed is stabilized, and a predetermined pressure setting means which sets a predetermined pressure as the hydraulic pressure for maintaining a releasing state of the lock-up clutch for the first predetermined time set by the time setting means.

In order to achieve the second object, the lock-up slip control device further comprises a second time setting means that sets a second predetermined time from a shift end until the input rotation speed is stabilized when the shift is determined in the first predetermined time, and the predetermined pressure setting means sets the predetermined pressure as the hydraulic pressure for maintaining a releasing state of the lock-up clutch for the time from the satisfaction of conditions for the lock-up slip control start to the end of the second predetermined time.

In order to achieve the third object, the lock-up slip control device further comprises a changing device which changes a route of the hydraulic pressure, and the predetermined pressure is a limited maximum pressure with which the lock-up clutch is maintained in a releasing state in a state in which the changing device is able to perform the lock-up slip control.

In order to achieve the fourth object, the lock-up slip control device further comprises an actual slip rotation speed detector that detects actual slip rotation of the lock-up clutch, a calculator that calculates a hydraulic pressure needed for achieving the actual slip rotation speed, a comparing means that compares the predetermined pressure and the hydraulic pressure calculated by the calculator, and a correcting means that corrects the hydraulic pressure after the first predetermined time has elapsed and the second predetermined time has elapsed based on a result from the comparing means.

In order to achieve the fifth object, The lock-up slip control device further comprises a target slip rotation speed setting means that sets a target slip rotation speed based on the actual slip rotation speed. The target slip rotation speed setting means sets the target slip rotation speed during a time from the start of slip rotation speed in the releasing state to the basic target slip rotation speed in a target value convergence control after the first predetermined time and the second predetermined time, and the target slip rotation speed is set by reducing the amount of reduction of target slip rotation speed as the basic target slip rotation speed is approached.

According to the invention, the actual slip rotation speed before the start of the lock-up slip control is stabilized because the predetermined pressure is set as the hydraulic pressure applied to the lock-up clutch without consideration of the target slip rotation speed until the slip control is started. Then, the actual slip rotation speed does not become too low, and a noise is not produced. Therefore, discomfort for a driver is avoided.

Since the change of the actual slip rotation speed is large during a shift, when the shift is determined in the first predetermined time after satisfaction of the conditions for the slip control start, the first predetermined time is extended until the second predetermined time set by the second time setting circuit has elapsed after the shift end. Then, the control is stabilized, and the actual slip rotation speed does not become too low, and a noise is not produced. Therefore, discomfort for a driver is avoided.

The lock-up clutch is kept in the releasing state just before the start of the slip control until the slip control is started. Therefore, the slip control start after the first predetermined time is prevented from being late.

The linear solenoid output value after the slip control start is corrected based on the effect of the comparison between the predetermined pressure and the hydraulic pressure needed for achieving the current actual slip rotation speed. Then, the linear solenoid output value, which is usually proper for the actual input torque, is set. Therefore, the slip control is performed properly.

Further, the target value convergence control is performed during the slip control after the first predetermined time. Therefore, the actual slip rotation speed is controlled smoothly until the basic target slip rotation speed is achieved.

BRIEF DESCRIPTION OF THE DRAWINGS

The invention will be described in conjunction with the following drawings in which like features are designated with like reference characters, and wherein:

FIG. 7 is a table showing a map data of a solenoid pressure output from a linear solenoid valve in the hydraulic control circuit;

DETAILED DESCRIPTION OF PREFERRED EMBODIMENTS

The invention will become more apparent from the following detailed description of preferred embodiments with reference to the accompanying drawings.

Figure 1:
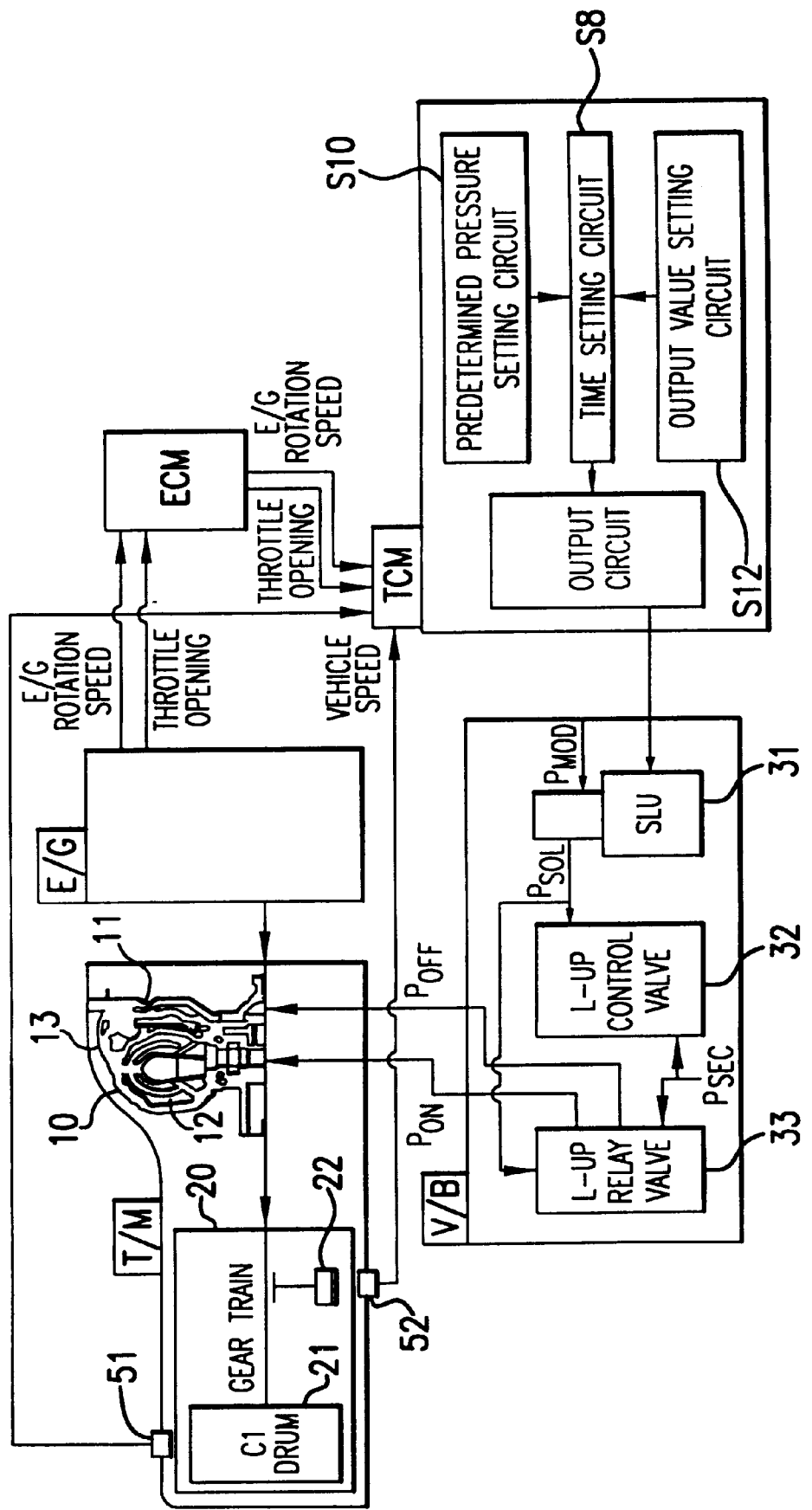
FIG. 1 is a system block diagram showing a system of the invention.

FIG. 1 is a system block diagram showing a lock-up slip control device for an automatic transmission according to an embodiment of the invention. The automatic transmission T/M comprises a hydraulic power transmission formed as a torque converter 10 having a lock-up clutch 11 connected to a vehicle engine E/G, a gear train 20 connected to the torque converter 10, and a hydraulic control circuit formed as a valve body V/B including many kinds of control valves for controlling engagement or disengagement of clutches and brakes in the gear train 20.

A control device for the automatic transmission T/M comprises an automatic transmission control device TCM comprising a micro computer as an electronic control device. The control device TCM performs a shift control and a lock-up control by operating the hydraulic control circuit in cooperation with an engine control device ECM. The lock-up slip control device comprises a transmission input rotation speed sensor 51 detecting a rotation speed of a turbine runner 13 of the torque converter 10 from a rotation of an input clutch drum 21 in the gear train 20, and a vehicle speed sensor 52 detecting a vehicle speed from a rotation of a gear 22 on the output side of the gear train 20, as an information detecting device for the lock-up slip control. In the lock-up slip control device, the automatic transmission control device TCM connected to the engine control device ECM can detect a rotation speed of a pump impeller 12 of the torque converter 10 from an engine rotation speed and a throttle opening of the engine E/G. Then, the automatic transmission control device TCM controls the lock-up clutch 11 of the torque converter 10 by controlling the hydraulic control circuit based on an actual slip rotation speed achieved from the vehicle speed, the throttle opening, the engine rotation speed, and the transmission input rotation speed.

The hydraulic control circuit in the valve body V/B according to the lock-up control comprises a linear solenoid valve 31 operated by a signal from the automatic transmission control device TCM, a lock-up control valve 32 operated by a solenoid pressure $P_{SOL}$ output from the linear solenoid valve 31, and a lock-up relay valve 33 operated by the solenoid pressure $P_{SOL}$. The lock-up control valve 32 adjusts a hydraulic pressure. The lock-up relay valve 33 applies a secondary pressure $P_{SEC}$ as an engaging pressure $P_{ON}$ or a releasing pressure $P_{OFF}$ to the torque converter 10 from one side and drains the engaging pressure $P_{ON}$ or the releasing pressure $P_{OFF}$ from the other side.

The automatic transmission control device TCM comprises an output value setting circuit S12 for a target value convergence control, a time setting circuit S8 for a transaction process, and a predetermined pressure setting circuit S10 for a transaction process. The time setting circuit S8 sets a predetermined time from a satisfaction of conditions for the slip control start until the input rotation speed is stabilized. The predetermined pressure setting circuit S10 sets a predetermined pressure as a hydraulic pressure applied to the lock-up clutch 11 for the predetermined time set by the time setting circuit. The predetermined pressure is a pressure with which the target value convergence control is started.

Figure 2:
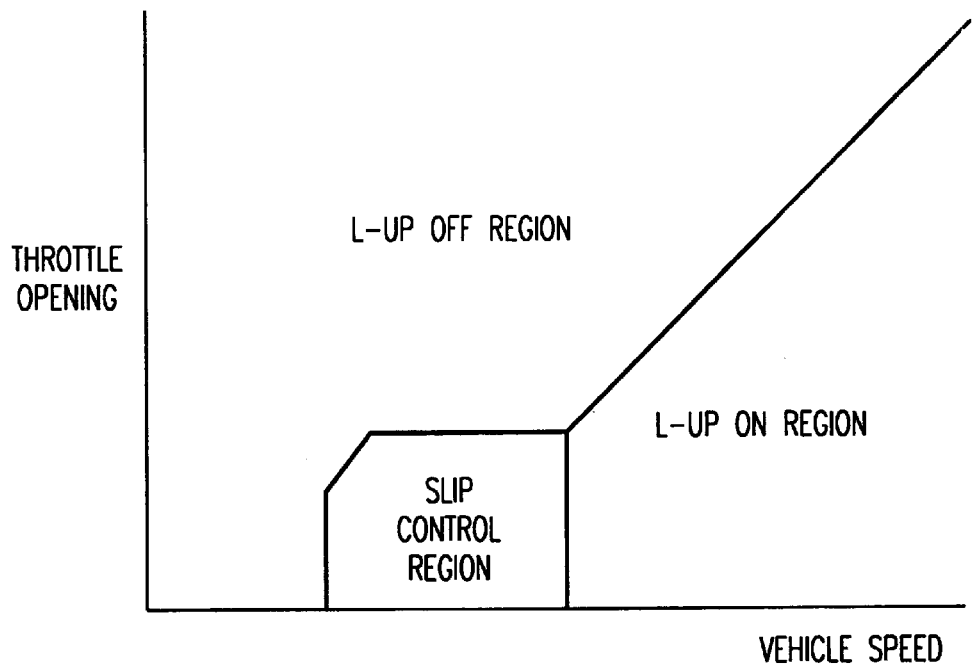
FIG. 2 is a lock-up diagram for a control of a lock-up clutch of the invention.

Aforementioned structures are described in detail. The automatic transmission control device TCM stores a lock-up diagram, which includes calculated regions based on the vehicle speed and the throttle opening, such as the map data shown in FIG. 2. As shown in FIG. 2, a slip control region is set on a side of low vehicle speed and low throttle opening in a lock-up ON region with a predetermined vehicle speed and a predetermined throttle opening. When vehicle operating conditions move from a lock-up OFF region to the slip control region because of an increase of the vehicle speed or a decreasing of the throttle opening, the automatic transmission control device TCM performs the target value convergence control to a slip rotation from the slip rotation speed in the releasing state to a basic target slip rotation speed by controlling the hydraulic pressure applied to the lock-up clutch 11 based on the target slip rotation speed which is updated continually. The slip rotation occurs in the lock-up clutch because of a difference of a rotation between the input rotation speed and the output rotation speed of the torque converter 10.

Figure 3:
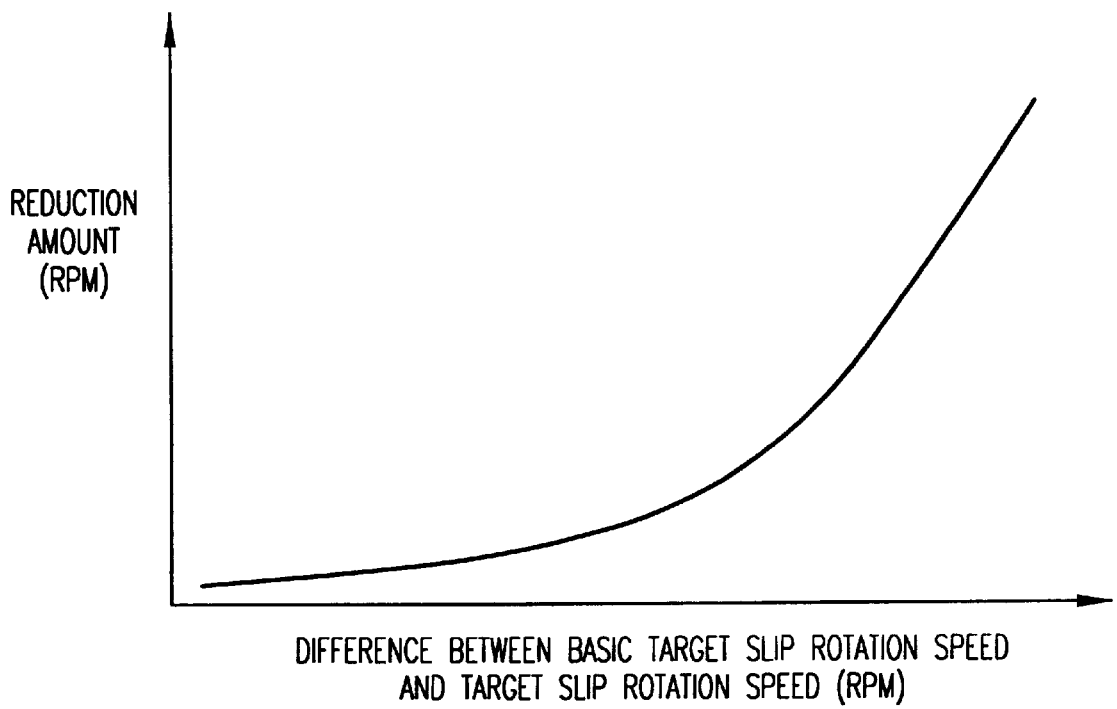
FIG. 3 is a characteristic diagram showing an amount of reduction of a target slip rotation speed in a target value convergence control of the invention.

FIG. 3 shows a characteristic of the target value convergence control. As shown in FIG. 3, in the target value convergence control, a reduction amount of the slip rotation speed is set corresponding with a difference between the basic target slip rotation speed and the target slip rotation speed. That is to say, if the difference becomes small, the reduction amount also becomes small. The target slip rotation speed is updated continually by being reduced in accordance with the proper reduction amount. Then, an overshoot of the actual slip rotation speed resulting from a feedforward control of the hydraulic control circuit is prevented by a solenoid signal output to the linear solenoid valve 31 based on the target slip rotation speed.

Figure 4:
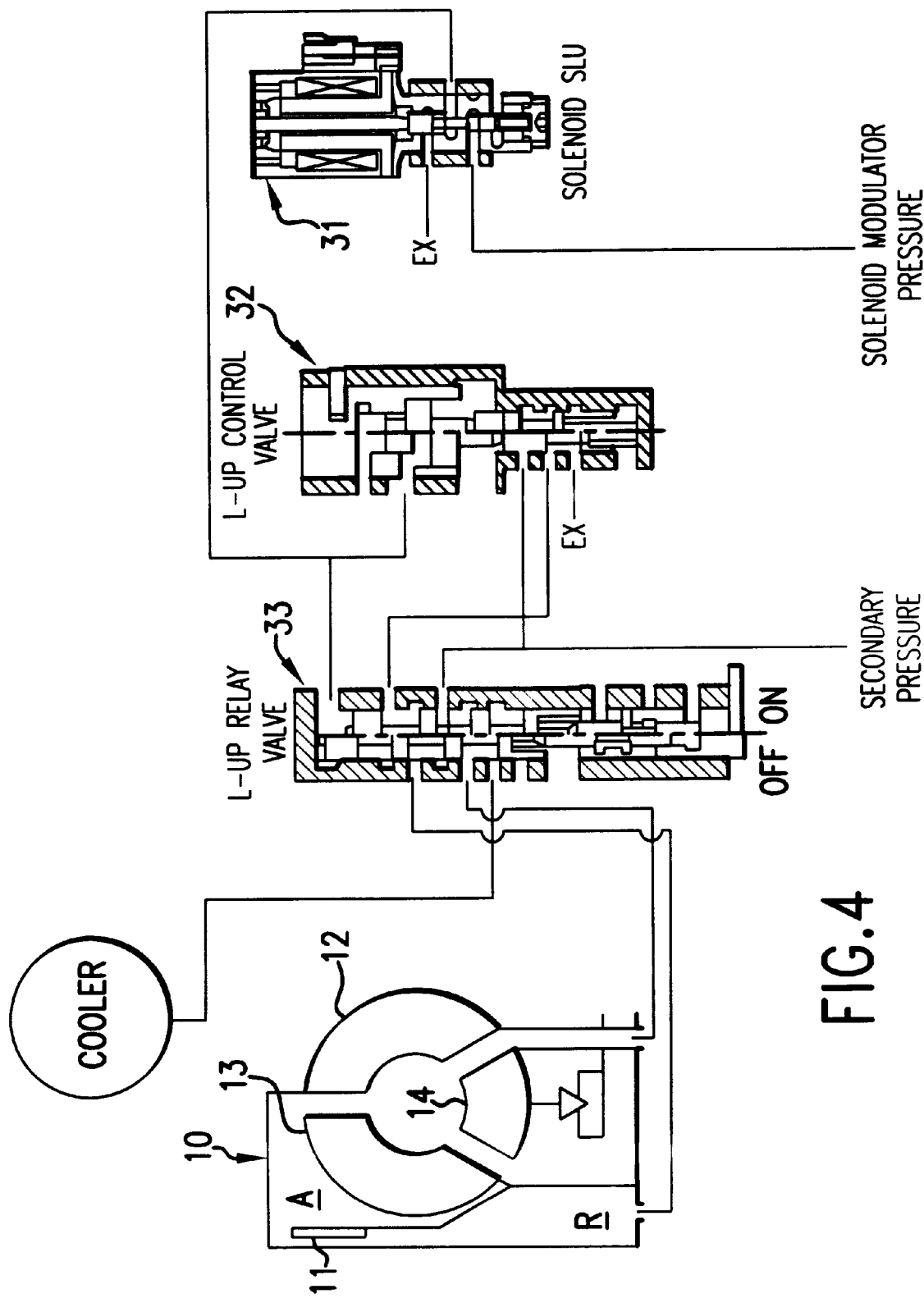
FIG. 4 is a circuit diagram showing a detail of a hydraulic control circuit of the invention.

As shown in FIG. 4 in detail, a hydraulic control circuit in the valve body V/B according to the lock-up control is arranged so that the secondary pressure $P_{SEC}$, which is adjusted from a line pressure in the hydraulic control circuit by a secondary regulator valve, is applied to the torque converter 10, and drained from the torque converter 10. The torque converter 10 comprises the pump impeller 12 integrated with a converter case, the turbine runner 13 arranged opposite the pump impeller 12, and a stator 14 arranged between the pump impeller 12 and the turbine runner 13. The lock-up clutch is arranged for connecting the converter case to turbine runner 13 directly. The torque converter 10 is in a lock-up OFF state when a hydraulic pressure is applied to a space between the converter case and the lock-up clutch 11 and the hydraulic pressure is drained from a side in which the pump impeller 12 is arranged. The torque converter 10 is in a lock-up ON state with the opposite operation of the hydraulic pressure.

The lock-up relay valve 33 is arranged as a changing device for the hydraulic pressure applied to the lock-up clutch. The lock-up relay valve 33 is structured with a spool valve having two operational states. In one of the states, the lock-up relay valve 33 is in a lock-up OFF position as shown on the left-half side in FIG. 4. In this state, the secondary pressure $P_{SEC}$ is applied to an oil chamber R, which is called as an OFF chamber from now on, on the side for releasing the lock-up clutch 11; and drained from an oil chamber A, which is called as an ON chamber from now on, on the side for engaging the lock-up clutch 11 through a cooler. In the other state, the lock-up relay valve 33 is in a lock-up ON position as shown on the right-half side in FIG. 4. In this state, the secondary pressure $P_{SEC}$ is applied to the ON chamber A and drained from the OFF chamber R to the lock-up control valve 32 through the lock-up relay valve 33. In that case, the hydraulic pressure drained from the OFF chamber R is regulated by the lock-up control valve 32 and drained from the lock-up control valve 32. The linear solenoid valve 31 outputs a solenoid pressure that is regulated from a solenoid modulator pressure reduced from a line pressure in the circuit by a modulator valve based on a solenoid signal output from the automatic transmission control device. The lock-up control valve 32 regulates and drains the hydraulic pressure in the OFF chamber R based on the solenoid pressure.

Figure 5:
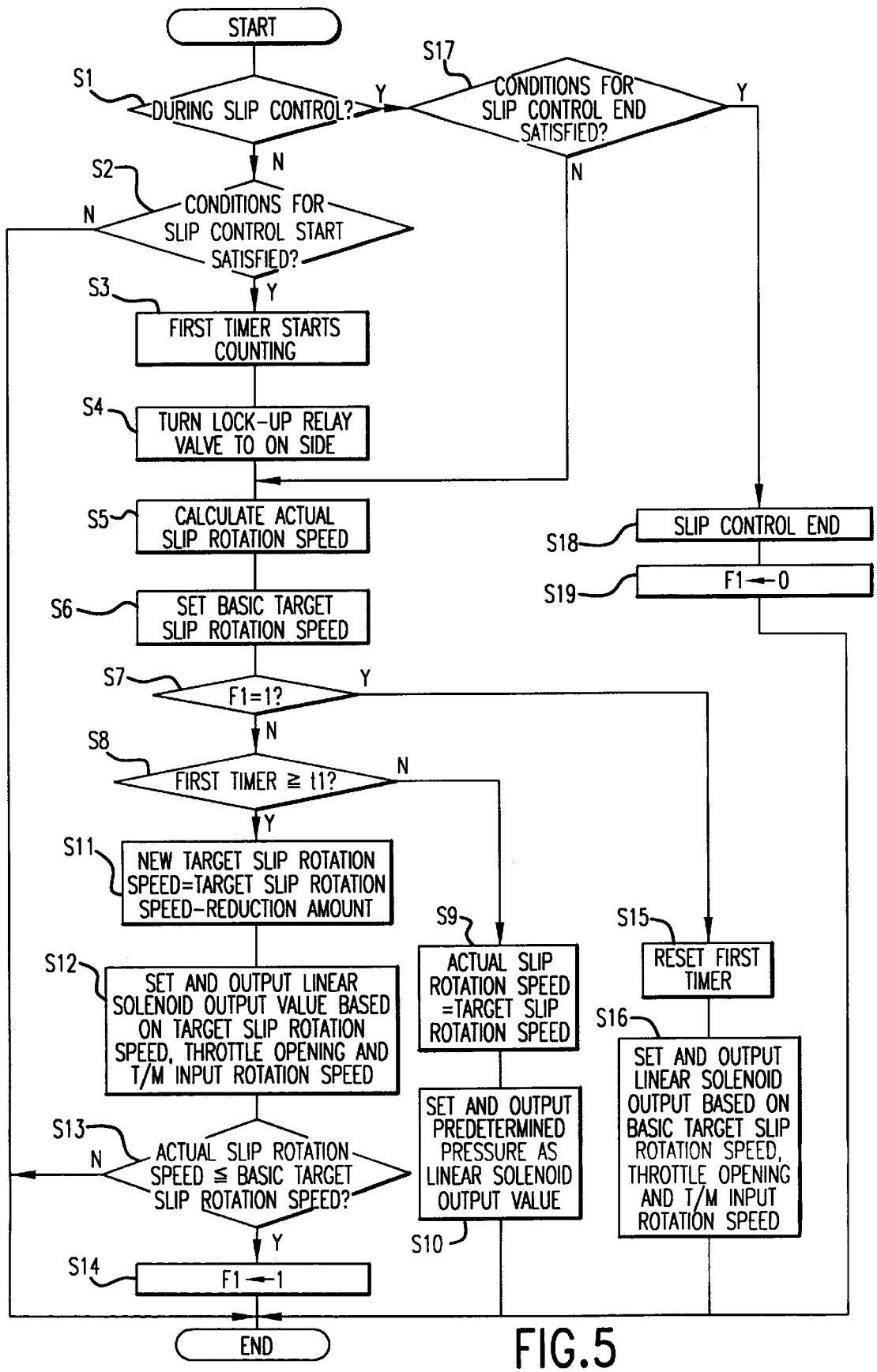
FIG. 5 is a flow chart for a lock-up slip control performed by an automatic transmission control device of the invention.

FIG. 5 is a flow chart showing the slip control performed by the automatic transmission control device TCM. In this control, at step S1, it is determined whether the slip control is being performed. Because this determination is that the slip control is not being performed at first, at step S2, it is determined whether conditions for the slip control start are satisfied. When the conditions are not satisfied, a next routine is performed without performing following processes. When the conditions are satisfied, at step S3, a first timer starts counting while waiting for the engine rotation speed to be stabilized. At step S4, the lock-up relay valve is turned to the ON side. Specifically, a load voltage applied to the linear solenoid valve 31 is made a high value for a very short time, and a high solenoid pressure is output from the linear solenoid valve 31 for the very short time. By this process, the hydraulic control circuit is changed to a state where the lock-up slip control is able to be performed. That is to say, the hydraulic control circuit is changed into a state in which the secondary pressure $P_{SEC}$ is applied to the ON chamber A and the hydraulic pressure drained from the OFF chamber R is bled to the lock-up control valve 32.

Figure 6:
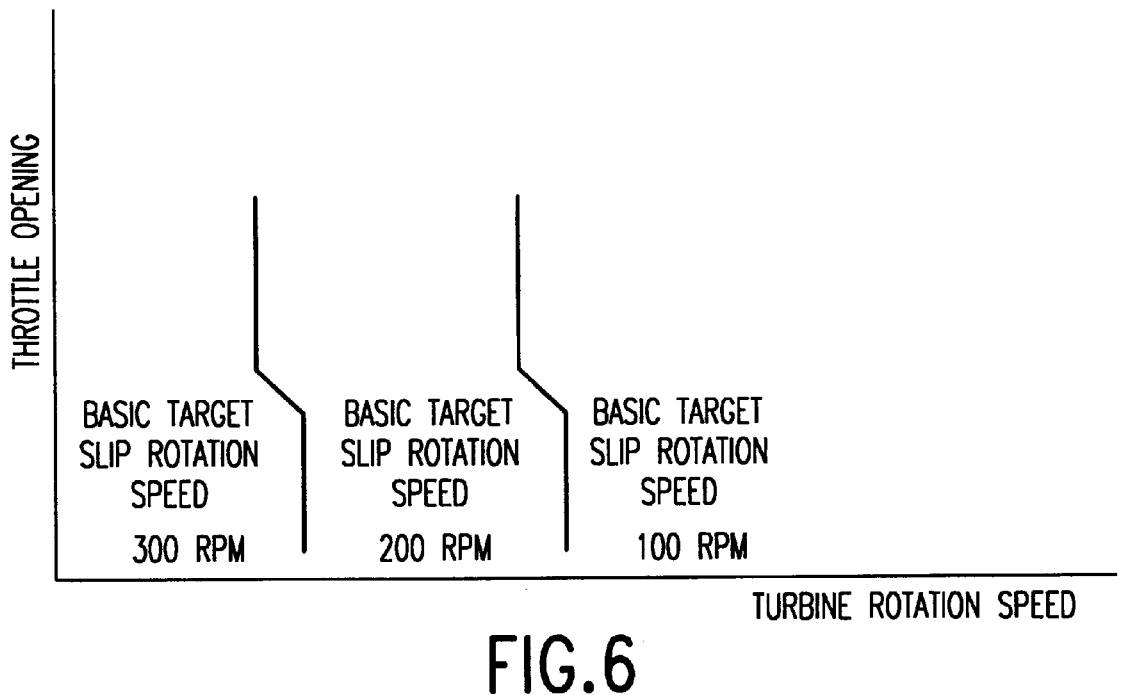
FIG. 6 is a map showing basic target rotation speeds stored in a memory of the automatic transmission control device.

At step 5, the actual slip rotation speed is calculated based on the engine rotation speed, that is the input rotation speed, applied from the engine control device ECM and the transmission input clutch rotation speed, that is the measured output rotation speed. At step S6, the basic target slip rotation speed is set as a final target rotation speed after the end of the target value convergence control. The basic target rotation speed is set based on a map showing a relationship between the turbine rotation speed and the throttle opening as shown in FIG. 6. The map is stored in a memory of the automatic transmission control device TCM. At step S7, it is determined whether the target value convergence control is ended. When the target value convergence control is ended, a flag F1 is 1. Because this determination is that F1 is 0 at first, at step S8, it is determined whether the first timer has counted an elapsed predetermined time t1 that is, for example, 800 msec. Because this determination is that the first timer has not elapsed t1 at first, at step S9, the actual slip rotation speed is set as the target slip rotation speed. At step S10, a predetermined pressure that is, for example, 1.2 kgf/cm$^2$ is set as a linear solenoid output value without consideration of the target slip rotation speed, the basic target slip rotation speed, and the actual slip rotation speed. Subsequently, the linear solenoid output value is output. These steps from step S1 through step S10 are continued until the first timer has elapsed the predetermined time t1 at step S8.

After the first timer has elapsed the predetermined time t1 at step S8, the target value convergence control is performed. At step S11, a new target slip rotation speed is calculated by subtracting a reduction amount from the target slip rotation speed set at the step S9. The reduction amount is set based on the difference between the basic target slip rotation speed and the target slip rotation speed which is a same value as the actual slip rotation speed in this case. At step S12, the linear solenoid output value is set based on the calculated target slip rotation speed, the throttle opening applied from the engine control device ECM, and the measured transmission input rotation speed. Subsequently, the linear solenoid output value is output. The hydraulic pressure output from the linear solenoid is shown on a table in FIG. 7. The table is an example in a case where the basic target slip rotation speed is 100 rpm. Tables for 200 rpm, 300 rpm, and so on, are also stored. If it is desired to use tables to store data for linear solenoid output values at more detailed levels of target slip rotation speeds, for example, tables for 290 rpm, 280 rpm, and so on, it is necessary to keep the tables for the linear solenoid in accordance with the number of the basic target slip rotation speeds. This is undesirable because memory capacity would have to be increased and the associated cost would also increase. Accordingly, the linear solenoid output value for the basic target slip rotation speed may be set by a linear transformation using the table of the linear solenoid output value for 300 rpm and 200 rpm. At step S13, it is determined whether the actual slip rotation speed is less than or equal to the basic target slip rotation speed. Therefore, the target value convergence control is continued until this determination is satisfied. When the actual slip rotation speed reaches the basic target slip rotation speed, the determination at step S13 is satisfied. At step S14 the flag F1 showing the end of the target value convergence control is set.

In the next routine, at step S7, the flag F1 is set 1. Then, slip control is performed from a step S15. At step S15, the first timer is reset. At step S16, the linear solenoid output value is set based on the basic target slip rotation speed, the throttle opening, and the transmission input rotation speed. The linear solenoid output value is also output. After that, at step S1, it is determined that the slip control is being performed. Therefore, step S5 through S7, step S15 and step S16 are continued until conditions for the end of the slip control are satisfied at step S17. The routine for the slip control is ended by the satisfaction of the conditions for the end of the slip control at step S17. At step S18, the end of the slip control is processed. At step S19, the flag F1 is cleared.

Figure 8:
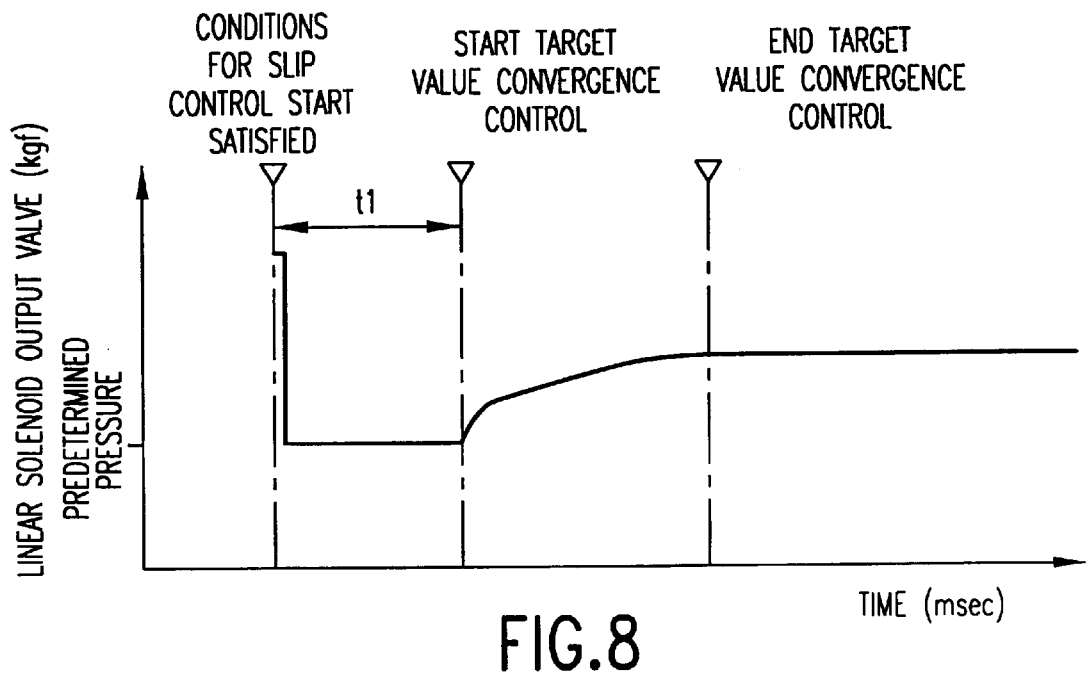
FIG. 8 is a time chart showing a typical change of a linear solenoid output value according to the embodiment.
Figure 9:
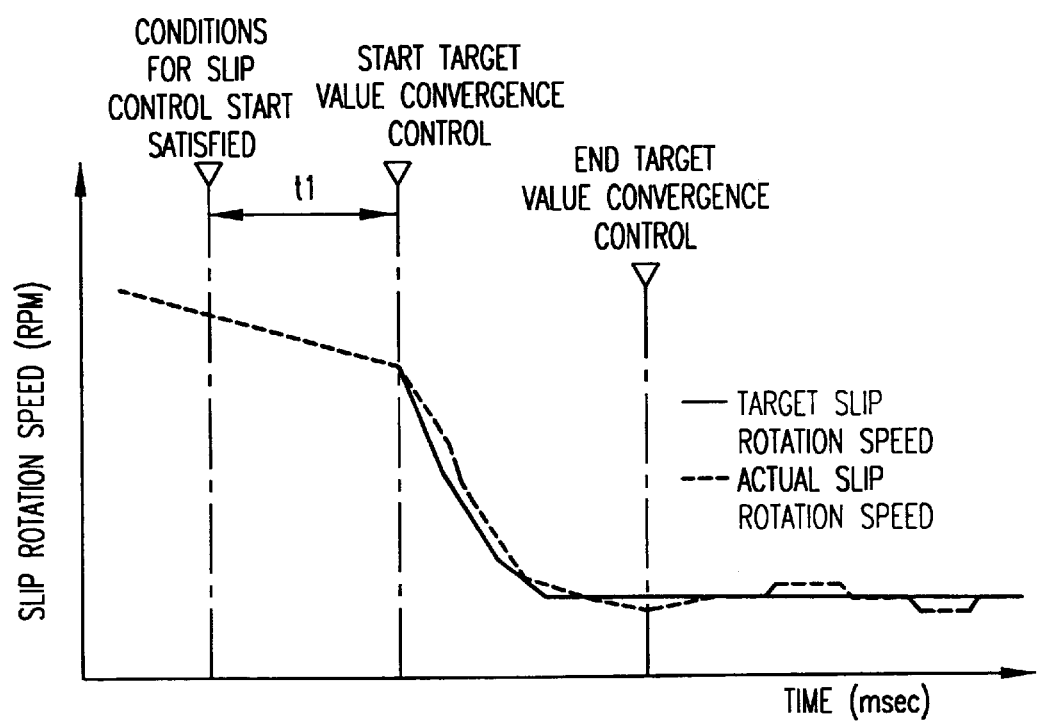
FIG. 9 is a time chart showing a typical change of a slip rotation speed according to the embodiment.

FIG. 8 is a time chart showing a typical change of the linear solenoid output value changed by the control flow. FIG. 9 is a time chart showing a change of the slip rotation speed changed by the linear solenoid output value. As shown in FIG. 8, the high linear solenoid output is output for changing lock-up relay valve 33 at step S4 from the time which is the same time as the start for counting of the first timer after the satisfaction of the conditions for the slip control start. After that, the predetermined pressure is output for the elapsed time t1 of the first timer. In this state, in the hydraulic control circuit as shown in FIG. 4, lock-up relay valve 33 is in a lock-up ON position as shown on the right-half side in FIG. 4. In this state, the secondary pressure $P_{SEC}$, which is the predetermined pressure, is applied to the ON chamber A and bled from the OFF chamber R to the lock-up control valve 32 through the lock-up relay valve 33. The hydraulic pressure bled from the OFF chamber R is regulated by the lock-up control valve 32 and drained from the lock-up control valve 32. Therefore, the lock-up clutch 11 is kept in the releasing state just before the slip state by a balance between the secondary pressure $P_{SEC}$ in the ON chamber A and the hydraulic pressure, which is a back pressure, in the OFF chamber R.

After the first timer counts the time t1, the linear solenoid output value is increased at a predetermined rate to the target value convergence control by the processes in step S11 and step S12. As a result, the actual slip rotation speed shown with a broken line in FIG. 9 parallels the target slip rotation speed, which is renewed and set by subtracting the predetermined reduction amount, shown with a solid line in FIG. 9. When the target slip rotation speed becomes less than the basic target slip rotation speed, and the actual slip rotation speed becomes less than the basic target slip rotation speed, the flag F1 is set at step S14 and the target value convergence control is ended. After that, the lock-up slip control is performed in a usual manner.

In this embodiment, as shown in FIG. 9, the actual slip rotation speed occurs as normal and has no influence on the target slip rotation speed for the predetermined time t1 after satisfaction of conditions for the lock-up control start. Therefore, the target slip rotation speed, which is set based on the actual slip rotation speed, is set based on the original actual slip rotation speed properly at the start of the target value convergence control.

Figure 10:
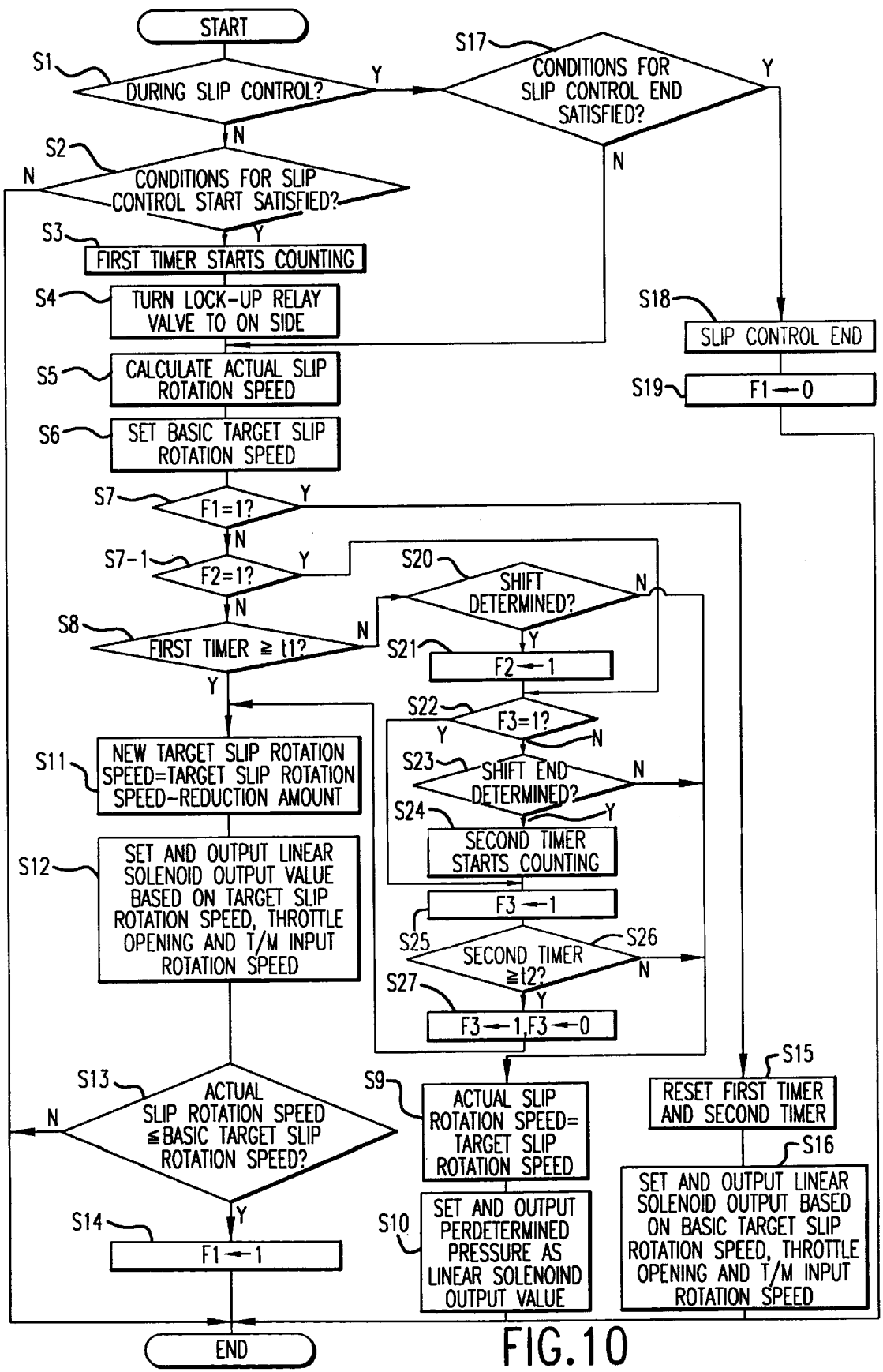
FIG. 10 is a flow chart for a second embodiment of the invention.

FIG. 10 is a flow chart showing another embodiment of the lock-up slip control. The embodiment shown in FIG. 10 corresponds to a case in which a shift is determined while the first timer is counting. Because the control in this embodiment is basically the same as the aforementioned first embodiment, only steps that are different from the first embodiment, are explained.

In this embodiment, step S7-1 for determining a flag F2 is added for determining the shift between step S7 and step S8. Therefore, when the first timer has not counted the predetermined time t1 at step S8 and a shift is not determined at step S20, the control is same as the first embodiment.

When the shift is determined at step S20, the flag F2 is set for the shift determination at step S21. At step S22, it is determined whether a flag F3 is 1, that is, it is determined whether the shift is ended. Because the flag F3 is 0 at first, at step S23, it is determined that shift is not ended. Then, at step S9, the actual slip rotation speed is set as the target slip rotation speed, and at step S10, the predetermined pressure is set as the linear solenoid output value corresponding to the target slip rotation speed, and the linear solenoid output value is output. In the next routine, at step S7-1, the flag F2 is 1. Then, it is determined whether the flag F3 is 1 for determining the end of the shift at step S22. After that, the routine is continued until the shift end is determined at step S23.

When the shift end is determined at step S23, a second timer is started counting at step S24, and the flag F3 is set at step S25. At step S26, it is determined whether the second timer has counted a predetermined time t2. Because the second timer has not counted t2 at first steps S9 and S10 are processed.

In the next routine, because the flag F3 is 1 at step S22, it is determined whether the second timer has counted the second predetermined time t2 at step S26.

When the second timer has counted the predetermined time t2 at step S26, at step S27, the flag F2 and the flag F3 are cleared and steps S11, S12, S13, and S14 for the target value convergence control are processed. The control embodiment after that is the same as the first embodiment substantially. But, in this embodiment, the first timer and the second timer are reset at step S15'.

Figure 11:
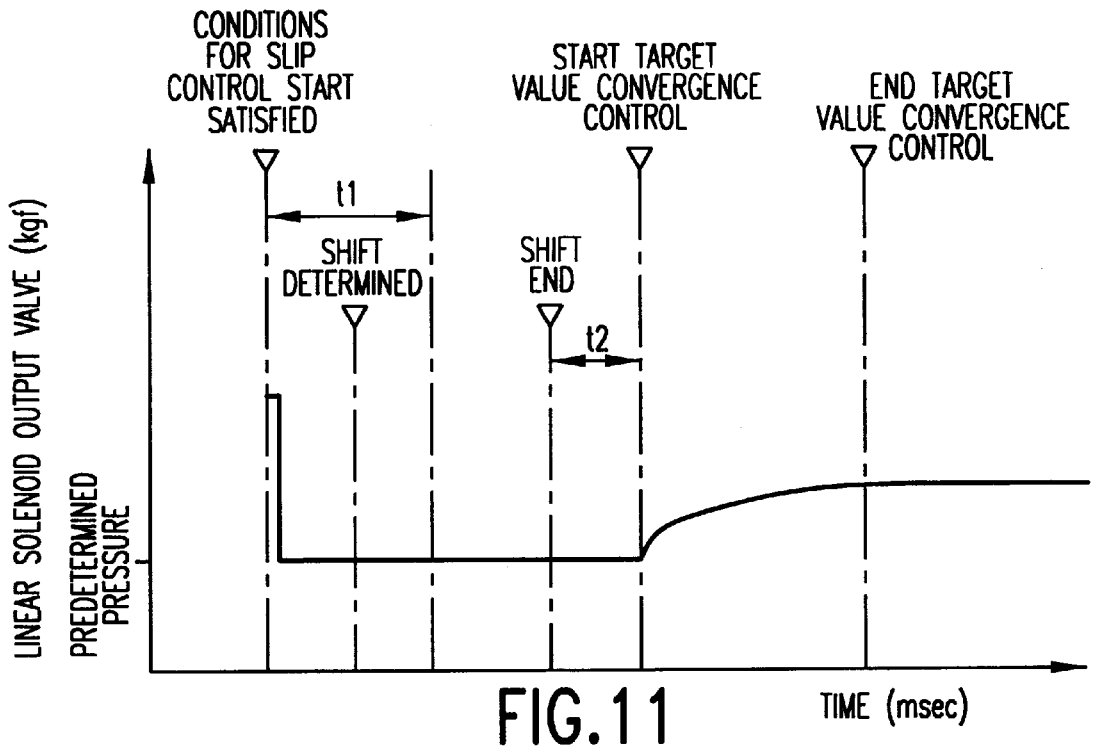
FIG. 11 is a time chart showing a linear solenoid output value according to the second embodiment.
Figure 12:
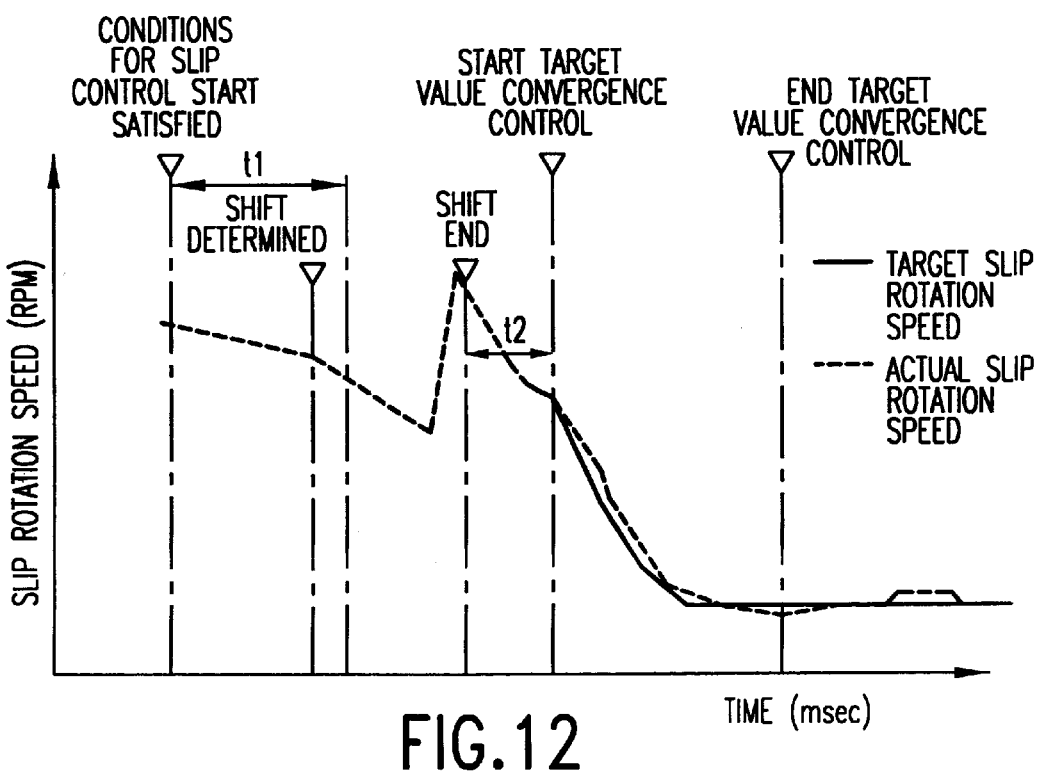
FIG. 12 is a time chart showing a change of a slip rotation speed according to the second embodiment.

FIG. 11 is a time chart showing a typical change of the linear solenoid output value for the second embodiment. FIG. 12 is a time chart showing a change of the slip rotation speed changed by the linear solenoid output value. In this case, the time for outputting the linear solenoid output for the predetermined pressure is expanded for the time t2 from the time of the shift end. In this time, as shown in FIG. 12, the actual slip rotation speed, which is shown with a broken line, is changed largely at around the shift end. But as shown in FIG. 11, in this time, the linear solenoid output is kept at the predetermined value in order to maintain the predetermined pressure, and the actual slip rotation speed is changed without influence of the target slip rotation speed. Therefore, at the time of the target value convergence control start, the actual slip rotation speed is an original value, and the target slip rotation speed is set properly based on the actual slip rotation speed.

Figure 13:
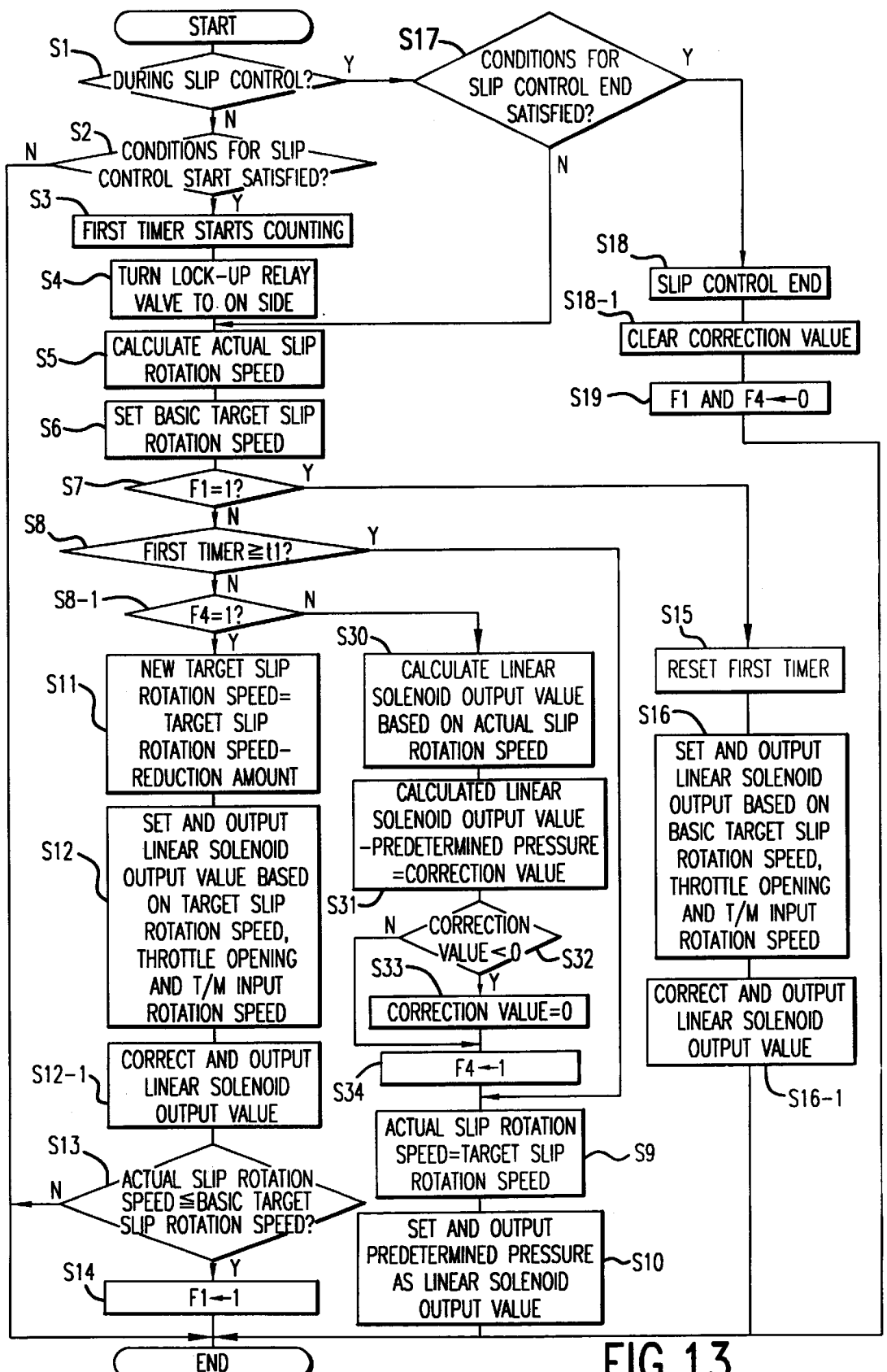
FIG. 13 is a flow chart for a third embodiment of the invention.

FIG. 13 is a flow chart showing a further embodiment of the slip control. In this embodiment, the linear solenoid output value is corrected after keeping at the predetermined value. Because the control in this embodiment is basically the same as the aforementioned first embodiment, only steps that are different from the first embodiment are explained.

In this embodiment, step S8-1 for determining a correction value setting flag F4 is added after step S8 for determining the first timer. Therefore, at a first routine after the first timer has counted the predetermined time t1, step S30 through step S34 are processed before step S9 because the flag F4 is 0.

These steps are processed in consideration of a reduction of the engine output. For example, if the engine output is degraded, the linear solenoid output value is not a proper value because the linear solenoid output value is set by the throttle opening and the turbine speed. When the engine output is not degraded, it is assumed that the engine output torque corresponding to the throttle opening 20 is A. When the engine output is degraded, the output torque corresponding to the throttle opening 20 is B which is lower than A. The linear solenoid output value is set on the assumption that it becomes A, when the throttle opening is 20. Accordingly, when the engine output is degraded, the linear solenoid output value setting by the throttle opening and the turbine rotation speed is too large for achieving the target slip rotation speed. Although the actual slip rotation speed is nearly equal to the target slip rotation speed when the engine output is not degraded, the actual slip rotation speed is smaller than the target slip rotation speed. Therefore the lock-up clutch may be engaged with an incorrect timing. The steps in FIG. 13 prevent the lock-up clutch from being engaged with wrong timing. At step S30, the linear solenoid output value is calculated based on the actual slip rotation speed. At step S31, a correcting value is calculated by subtracting the predetermined pressure from the calculated linear solenoid output value. At step S32, it is determined whether the correcting value is a negative value. Then, when the correcting value is a negative value, which means the linear solenoid output value is to be increased, the correcting value is set 0 at step S33 and the correcting value setting flag F4 is set at step S34. When the correcting value is a positive value, which means the linear solenoid output value is to be decreased, the correcting value setting flag F4 is set at step S34. Therefore, because the correcting value setting flag F4 is 1 at step S8-1 in the next routine, the target value convergence control is performed from step S11. In the target value convergence control, the new target slip rotation speed is set by subtracting the reduction amount from the target slip rotation speed. The control embodiment after that is the same as the first embodiment basically. However, in this case, at step S12-1 and step S16-1, the correcting value is set as the linear solenoid output value.

In this embodiment, the hydraulic pressure after the target value convergence control start is corrected based on the result of the comparison between the predetermined pressure and the pressure needed for achieving the current actual slip rotation speed. Then, the hydraulic pressure is set based on the target slip rotation speed which is proper for the actual input torque. Therefore, the target value convergence control is performed properly.

The above-described three embodiments are representative of the lock-up slip control according to the present invention. This invention is not limited to these embodiments but can be modified in various manners as would occur to one skilled in the art on the basis of the above description, and such modifications should not be excluded from the scope of the invention.

What is claimed is:

1. A lock-up slip control device for an automatic transmission, which controls a slip amount of a lock-up clutch, with the slip amount being a difference between an input rotation speed of a hydraulic power transmission and an output rotation speed of the hydraulic power transmission, and causes the slip amount to converge on a basic target slip rotation speed by controlling a hydraulic pressure applied to the lock-up clutch, the lock-up slip control device comprising:

a predetermined pressure setting means that sets a predetermined pressure as the hydraulic pressure for keeping a releasing state of the lock-up clutch for a time from satisfaction of conditions for a lock-up slip control start until the input rotation speed is stabilized when a lock-up clutch state is changed from a release state to a slip state.

2. The lock-up slip control device for an automatic transmission according to claim 1, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized; and the target slip rotation speed is set by reducing a reduction amount of the target slip rotation speed as the target slip rotation speed approaches the basic target slip rotation speed.

3. The lock-up slip control device for an automatic transmission according to claim 1, further comprising:

the predetermined pressure setting means continually sets the predetermined pressure as the hydraulic pressure for keeping a releasing state of the lock-up clutch for a time from the satisfaction of conditions for the lock-up slip control start until the input rotation speed is stabilized when a shift is determined in the time from the satisfaction of conditions for the lock-up slip control start until the input rotation speed is stabilized.

4. The lock-up slip control device for an automatic transmission according to claim 3, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

5. The lock-up slip control device for an automatic transmission according to claim 3, further comprising:

the predetermined pressure is a limited maximum pressure with which the lock-up clutch is kept in the release state.

6. The lock-up slip control device for an automatic transmission according to claim 5, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

7. The lock-up slip control device for an automatic transmission according to claim 5, further comprising:

an actual slip rotation speed detector which detects an actual slip rotation speed of the lock-up clutch which is equal to a target slip rotation speed for the time from satisfaction of conditions for the lock-up slip control start until the input rotation speed is stabilized;

a calculator which calculates a hydraulic pressure that achieves the actual slip rotation speed;

a comparing means which compares the predetermined pressure and the hydraulic pressure calculated by the calculator; and a correcting means which corrects the hydraulic pressure after elapsing of the second predetermined time based on a result from the comparing means.

8. The lock-up slip control device for an automatic transmission according to claim 7, further comprising:

a target slip rotation speed setting means which sets a target slip rotation speed based on the actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

9. The lock-up slip control device for an automatic transmission according to claim 3, further comprising:

an actual slip rotation speed detector which detects an actual slip rotation speed of the lock-up clutch which is equal to a target slip rotation speed for the time from satisfaction of conditions for the lock-up slip control start until the input rotation speed is stabilized;

a calculator which calculates a hydraulic pressure that achieves the actual slip rotation speed;

a comparing means which compares the predetermined pressure and the hydraulic pressure calculated by the calculator; and a correcting means which corrects the hydraulic pressure after elapsing of the second predetermined time based on a result from the comparing means.

10. The lock-up slip control device for an automatic transmission according to claim 9, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

11. The lock-up slip control device for an automatic transmission according to claim 1, further comprising:

the predetermined pressure is a limited maximum pressure with which the lock-up clutch is kept in the release state.

12. The lock-up slip control device for an automatic transmission according to claim 11, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

13. The lock-up slip control device for an automatic transmission according to claim 11, further comprising:

an actual slip rotation speed detector which detects an actual slip rotation speed of the lock-up clutch which is equal to a target slip rotation speed for the time from satisfaction of conditions for the lock-up slip control start until the input rotation speed is stabilized;

a calculator which calculates a hydraulic pressure that achieves the actual slip rotation speed;

a comparing means which compares the predetermined pressure and the hydraulic pressure calculated by the calculator; and a correcting means which corrects the hydraulic pressure after elapsing of the first predetermined time based on a result from the comparing means.

14. The lock-up slip control device for an automatic transmission according to claim 13, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

15. The lock-up slip control device for an automatic transmission according to claim 1, further comprising:

an actual slip rotation speed detector which detects an actual slip rotation speed of the lock-up clutch which is equal to a target slip rotation speed for the time from satisfaction of conditions for the lock-up slip control start until the input rotation speed is stabilized;

a calculator which calculates a hydraulic pressure that achieves the actual slip rotation speed;

a comparing means which compares the predetermined pressure and the hydraulic pressure calculated by the calculator; and a correcting means which corrects the hydraulic pressure after elapsing of the first predetermined time based on a result from the comparing means.

16. The lock-up slip control device for an automatic transmission according to claim 15, further comprising:

a target slip rotation speed setting means which sets a target slip rotation speed based on an actual slip rotation speed;

the target slip rotation speed setting means sets the target slip rotation speed during a time from initiation of a slip rotation speed in the releasing state to the basic target slip rotation speed in a target value convergence control after the time from the satisfaction of conditions for the lock-up slip control start until the input rotation speed is stabilized, when the shift is determined in the time from satisfaction of conditions for lock-up slip control start until the input rotation speed is stabilized; and the target slip rotation speed is set by reducing a reduction amount of the target slip rotation speed as the target slip rotation speed approaches the basic target slip rotation speed.

17. A lock-up slip control method for an automatic transmission which controls a slip amount of a lock-up clutch, with the slip amount being a difference between an input rotation speed of a hydraulic power transmission and an output rotation speed of the hydraulic power transmission, and causes the slip amount to converge on a basic target slip rotation speed by controlling a hydraulic pressure applied to the lock-up clutch, the lock-up slip method comprising the step of:

setting a predetermined pressure as the hydraulic pressure for keeping a releasing state of the lock-up clutch for a time from satisfaction of conditions for a lock-up slip control start until the input rotation speed is stabilized when a lock-up clutch state is changed from a release state to a slip state.

18. The lock-up slip control method for an automatic transmission according to claim 17, further comprising the step of:

continually setting the predetermined pressure as the hydraulic pressure for keeping a releasing state of the lock-up clutch until the input rotation speed is stabilized when a shift is determined in the time from the satisfaction of conditions for the lock-up slip control start until the input rotation speed is stabilized.

19. A recording medium encoded with an executable program capable of controlling a slip amount of a lock-up clutch, with the slip amount being a difference between an input rotation speed of a hydraulic power transmission and an output rotation speed of the hydraulic power transmission, and with the program causing the slip amount to approach a basic target slip rotation speed by controlling a hydraulic pressure applied to the lock-up clutch, the program including the step of:

setting a predetermined pressure as the hydraulic pressure for keeping a releasing state of the lock-up clutch for a time from satisfaction of conditions for a lock-up slip control start until the input rotation speed is stabilized when a lock-up clutch state is changed from a release state to a slip state.

20. The recording medium encoded with an executable program capable of controlling a slip amount of a lock-up clutch according to claim 19, wherein the program further includes a step for:

continually setting the predetermined pressure as the hydraulic pressure for keeping a releasing state of the lock-up clutch until the input rotation speed is stabilized when a shift is determined in the time from the satisfaction of conditions for the lock-up slip control start until the input rotation speed is stabilized.

* * * * *